United States Patent
Tateo et al.

[11] 3,729,665
[45] Apr. 24, 1973

[54] DIRECT SUPPLY CONTROL DEVICE FOR A TRACTION MOTOR OF VEHICLES, PARTICULARLY FOR ELECTRIC LIFTING TRUCKS

[75] Inventors: Vito Tateo, Milan; Guido Galli, Bastiglia, both of Italy

[73] Assignee: Fabrica Italian Magneti Marelli S.p.A., Milan, Italy

[22] Filed: Nov. 2, 1971

[21] Appl. No.: 194,965

[30] Foreign Application Priority Data

Nov. 17, 1970  Italy..............................31831 A/70

[52] U.S. Cl...............................318/139, 318/341
[51] Int. Cl..........................................H02p 5/16
[58] Field of Search..........................318/139, 341

[56] References Cited

UNITED STATES PATENTS 3,500,161  3/1970  Domann..............................318/341
3,562,617  2/1971  Meier..................................318/341
3,656,038  4/1972  Ries....................................318/139
3,223,908  12/1965  Hutchinson........................318/139

*Primary Examiner*—Bernard A. Gilheany
*Assistant Examiner*—Thomas Langer
*Attorney*—Sidney G. Faber et al.

[57] ABSTRACT

In a vehicle operated by a traction motor, a circuit for controlling the electrical supply to the traction motor in accordance with the speed desired by the operator, which is preferably determined by a foot operated pedal. An electrical storage member stores energy, the magnitude of which is directly related to the motor operating speed at any given instant. When the pedal is fully depressed for maximum traction the storage member operates to delay the energization of a programmed unijunction device at a rate which is inversely proportional to control parameters of the motor so as to provide a substantially gradual transition to the condition of maximum traction.

5 Claims, 1 Drawing Figure

Patented April 24, 1973                          3,729,665
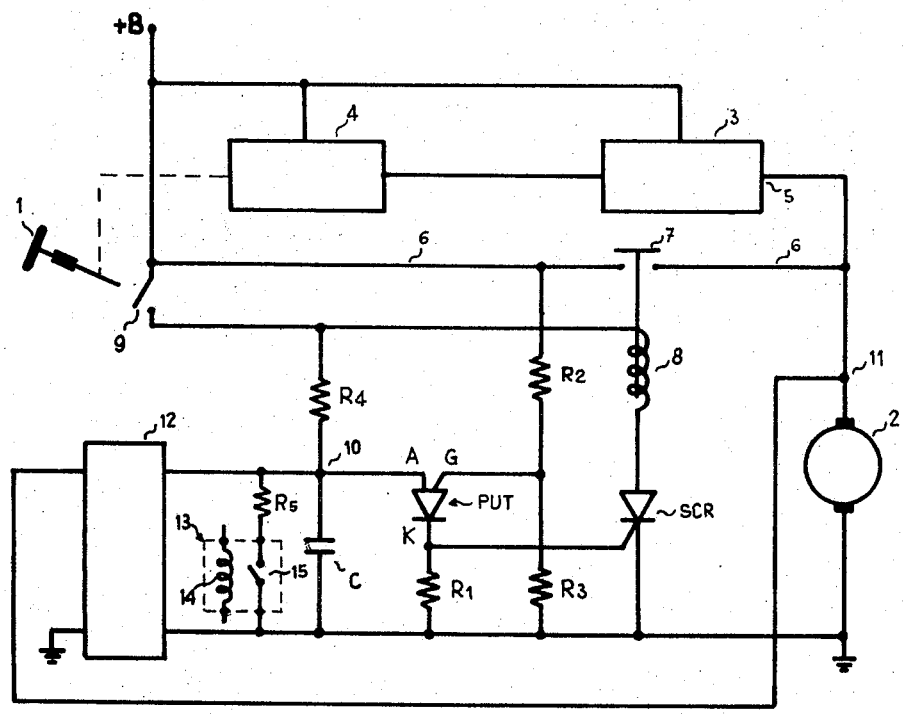
INVENTORS
VITO TATEO
GUIDO GALLI
by
Ostrolenk, Faber, Gerb & Soffen
ATTORNEYS

DIRECT SUPPLY CONTROL DEVICE FOR A TRACTION MOTOR OF VEHICLES, PARTICULARLY FOR ELECTRIC LIFTING TRUCKS

This invention relates to a direct supply control device for vehicle traction motors, which cuts out, when connected, the controlled power supplied to the motor by an electronic regulation circuit controlled by the speed pedal of the vehicle, particularly an electric lifting truck.

As is well known, by using such regulation circuits, the motor supply can be continuously controlled, thus avoiding sudden changes in the vehicle speed.

As a matter of fact, through such a regulation the motor can operate according to a series of "regulation curves" corresponding to the various positions of the pedal, rather than according to the motor "characteristic curve" which is provided by cutting out the regulation circuits upon pressing the pedal to its end of stroke.

To understand the significance of a progressive controlled speed, it will suffice to refer to electric lifting trucks which, as well known, are very often intended for carrying goods to be handled with care, cumbersome and unbalanced loads, and are also caused to travel winding paths in warehouses and the like.

However, where the truck should overcome a very high starting torque or reach quite high speeds, it would be necessary to cut out the regulation circuit by the pedal operation and directly connect the supply battery to the motor to pass from a reduced power controlled operation to an operation according to the "characteristic curve." This operation may cause a sudden change in the vehicle speed and accordingly possible troubles and damages to the articles being carried or to the persons, particularly when accomplished at low speeds of the motor.

The object of the present invention is to provide a control circuit, particularly for electric lifting trucks and capable of connecting the direct supply for the motor and cutting out the controlled supply without the occurrence of the above mentioned drawbacks, regardless of the vehicle speed at the time of carrying out the control operation.

The circuit according to the invention comprises an electromagnet for controlling the connection of the motor direct supply circuit, the energization of which depends on the closing of a switch operated by the vehicle running pedal at a position of end of stroke and on the conduction state of a controlled rectifier diode driven by an electronic timing circuit which is continuously affected by the supply voltage and/or other varying parameter of the motor and, upon switch closing, also on the battery voltage, so that said timing circuit will fire the diode with a resulting energization of the electromagnet and connection of the motor direct supply with a delay inversely depending on the voltage value and/or other parameter of the motor at the closing of daid switch.

By this delay the motor is enabled to gradually accomodate the new performances being required, thus removing the above mentioned drawbacks.

According to a preferred embodiment of the invention, the timing circuit comprises a programmable unijunction transistor, the cathode of which controls the firing of the controlled rectifier diode and the anode of which is voltage controlled by a capacitor permanently connected across the motor and also across the battery when the pedal operated switch is closed. Where the controlled supply for the motor is of the square wave type or the like, the motor supply terminal is connected through a filter to the capacitor, so that the voltage across the latter corresponds to the average value of the voltage applied to the motor.

Further features and advantages of the invention will become apparent from the description of the accompanying drawing showing by mere way of example the electric diagram of a control circuit for the direct supply of the motor in accordance with the invention.

The diagram shows at 1 the vehicle running pedal, which vehicle in the course of the following disclosure is assumed to be an electric lifting truck, and at 2 the direct current traction motor.

In a per se known manner, the controlled supply for the motor is provided by means of the electronic regulation circuit 3 which is controlled by the transducer 4, in turn controlled by the pedal 1.

At each position of the pedal, said transducer 4 supplies control signals to the regulation circuit 3 which adjustably controls the supply to the motor.

Circuit 3 may be of any known type, but in this disclosure it is assumed to comprise a "Jones chopper," so as to have at its outlet 5, and hence at the inlet to motor 2, a square wave signal of a variable frequency.

The direct supply for motor 2 is provided by means of line 6 connecting battery +B to the motor through the switch 7 which is closed upon energization of the electromagnet 8. According to the invention, this electromagnet is connected in a supply circuit comprising a normally open switch 9 and a silicon controlled diode SCR so as to be energized only when the switch is closed and the silicon controlled rectifier is fired.

The switch 9, in the following referred to as limit switch, is closed by pedal 1 only when the latter is urged to the position of end of stroke.

According to the invention, a programmable unijunction transistor PUT is provided for controlling the SCR diode, this transistor having its cathode K simultaneously connected to ground reference through the resistor $R_1$ and to the control electrode of the SCR diode, its gate G connected to battery +B through the resistive divider $R_2$, $R_3$ and the anode A connected to a capacitor C capable in a varying period of supplying the required voltage for firing or causing the unijunction transistor to become conductive.

To this end, terminal 10 of capacitor C is connected to both anode A and motor supply terminal 11 through the filter 12 and to battery +B through the resistor $R_4$ and limit switch 9.

The operation of the device is as follows. In order to provide the controlled supply for motor 2, the driver will act upon the pedal 1 only partially depressing the latter, so that the switch 9 is opened. Under these conditions, only the regulation circuit comprising the members 3 and 4 is active and a square wave signal of a variable frequency is applied to terminal 11. Thus, the motor operates according to different "regulation curves," all of which are below the "characteristic curve" in the diagram for the r.p.m. versus current drain.

The voltage square waves provided by the circuit 3 to the motor also supply upon levelling by filter 12 the capacitor C, across the latter there being therefore at any moment a voltage corresponding to the average value of said square waves.

The capacitor voltage is applied to the anode A of the programmable unijunction transistor PUT but, under the aforesaid conditions of controlled operation, this voltage is uncapble of causing the firing thereof as being lower, also under the conditions of highest supply for the motor, than the voltage applied to the gate G through the divider $R_2$, $R_3$. As a result, the SCR diode is not fired and the electromagnet 8 is not energized, and therefore the switch 7 and line 6 remain open.

Let it now be assumed that the motor is required to develop a high speed or starting torque in connection with special truck running requirements. Then, the driver will fully press down the pedal 1 and start the operation for connecting the direct supply of the motor and cutting out the controlled supply. Actually, the closing of line 6 through the switch 7, shunting the circuit 3, will not occur upon closing of limit switch 9, but only after a variable delay inversely depending on the motor supply conditions at that time, and this to enable the motor to gradually accomodate the new rating without sudden changes in speed resulting from rapidly passing from the "regulation curve" involved at the closing of switch 9 to the "characteristic curve."

This variable delay is provided by capacitor C which, from the closing of switch 9, attains the PUT triggering voltage, acting on anode A, at different times according to the voltage level across it at the time of said closing.

Thus, when switch 9 is closed under conditions of reduced controlled supply for the motor, the voltage level across C will be correspondingly low and the battery current provided thereto through switch 9 will take more time for raising its voltage to the PUT triggering value. PUT triggering will fire the SCR diode, while electromagnet 8 is energized, switch 7 is closed and line 6 is activated, the regulation circuit being by passed.

It is to be noted that the inverse law between the motor supply voltage level and the delay at which switch 7 is closed after closing of switch 9, corresponds to a practical need in order that the motor may smoothly accomodate the new rating imparted thereto upon fully pressing down the pedal, since said delay is higher when switch 9 is closed at low motor r.p.m. and, on the contrary, being lower at high motor r.p.m.

As above stated, the filter is provided for levelling the square wave voltage signal applied to the motor terminal 11, so that at point 10, and hence across the capacitor C, there will be a voltage corresponding to the average level of said voltage at terminal 11. However, it should be understood that the filter would be dispensed with where the motor supply is variable but continuous, as provided by a regulation circuit other than "Jones chopper".

Generally, the voltage across the capacitor C can be provided by any transducer responsive to the motor voltage, or other parameter of the motor.

Should it be desired to provide for electrically braking the motor, then the above described device would be completed by a circuit comprising a resistor $R_5$ and a reed switch 13.

This circuit is effective to short the capacitor C during braking step, so as to avoid closing of switch 7 through the programmable unijunction transistor PUT, SCR diode and electromagnet 8, upon closing of limit switch 9 accomplished by another control pedal (not shown).

To this end, the coil 14 of reed switch 13 is applied across the rotor of motor 2 and is energized only the braking current through an inverted diode (not shown).

Energization of coil 14 causes contact 15 of the reed switch to close and terminal 10 of capacitor C to be discharged through resistor $R_5$, so as to prevent programmable unijunction transistor PUT, diode SCR and electromagnet 8 from being energized.

Upon ceasing of the braking effect, the reverse current of the motor is reduced to zero, the coil 14 is de-energized, the contact 15 opens and the device resumes its operation as previously described.

The invention has been described by mere way of example with reference to a preferred embodiment. However, it should be understood that the circuit herein disclosed can be varied and modified, without departing for this from the scope and spirit of the invention.

What is claimed is:

1. An electronic control device for traction motors and the like comprising:
    a power source;
    a traction motor;
    a manually depressable operating pedal;
    adjustable means coupled between said power source and said motor and controlled by said operating pedal for adjustably coupling power to said motor from said power source in accordance with the amount of depression of said pedal;
    an electromagnet including first switch means for directly connecting said power source to said motor when said electromagnet is energized;
    second normally open switch means operable by said pedal for coupling said power source to said electromagnet when said pedal is fully depressed;
    first normally non-conductive electronic switch means coupled between said electromagnet and said power source and completing a current path including said power source, said electromagnet, said second switch means and said electronic switch means when said second switch means is closed and said electronic switch means is rendered conductive whereby said first switch means directly connects said power source to said motor bypassing said adjustable means;
    capacitor means coupled across said motor means for developing a voltage representing the value of the voltage supplied to said motor by said adjustable means;
    means further coupling said capacitor to said second switch means to couple said power source directly to said capacitor when said second switch means is closed;
    second normally non-conductive electronic switch means having first and second control inputs and an output, said first control input being coupled to said capacitor;
    means for coupling a constant proportional amount of the output level of said power source to said second control input to serve as a reference level;
    said second electronic switch means developing a signal at its output when the signal level at said first control input exceeds the reference lvel at said second control input;

said first electronic switch means having a control input coupled to the output of said second electronic switch means for energizing said electromagnet to supply full power to said motor after a variable time delay interval said time delay interval being inversely proportional to difference between the value of the voltage level developed by said capacitor just prior to the time when said pedal is fully depressed and said reference level.

2. The device of claim 1 wherein said second electronic switch means is a programmable unijunction transistor (PUT), said second control input being the gate (G) of the transistor; said coupling means being a voltage divider (R2,R3).

3. The device of claim 1 wherein said adjustable means is a variable square wave generator; filter means being coupled between said capacitor and said motor for smoothing the output of said adjustable means.

4. The device of claim 1 further comprising a normally open discharge means coupled across said capacitor which means further includes control means coupled to said motor being operative during the electrical braking step of the motor to close said discharge means and prevent said electromagnet from being energized.

5. The device of claim 4 wherein said discharge means comprises a series connected resistor and normally open reed switch which are connected across the capacitor, said reed switch including a coil energized by the motor braking current to close said reed switch during the braking operation of the motor.

* * * * *